(12) United States Patent
Richter et al.

(10) Patent No.: US 10,237,155 B2
(45) Date of Patent: Mar. 19, 2019

(54) METHOD AND DEVICE FOR OPERATING A CIRCUIT ARRANGEMENT, CIRCUIT ARRANGEMENT

(71) Applicant: Robert Bosch GmbH, Stuttgart (DE)

(72) Inventors: Tobias Richter, Bietigheim-Bissingen (DE); Stefan Butzmann, Schalksmühle (DE); Stefan Aldinger, Bad Wimpfen (DE)

(73) Assignee: Robert Bosch GmbH, Stuttgart (DE)

( * ) Notice: Subject to any disclaimer, the term of this patent is extended or adjusted under 35 U.S.C. 154(b) by 246 days.

(21) Appl. No.: 15/314,544

(22) PCT Filed: May 18, 2015

(86) PCT No.: PCT/EP2015/060844
§ 371 (c)(1),
(2) Date: Nov. 29, 2016

(87) PCT Pub. No.: WO2015/180982
PCT Pub. Date: Dec. 3, 2015

(65) Prior Publication Data
US 2017/0201442 A1    Jul. 13, 2017

(30) Foreign Application Priority Data
May 30, 2014  (DE) .......... 10 2014 210 280

(51) Int. Cl.
*H04L 12/26*  (2006.01)
*H04L 12/40*  (2006.01)
*H04L 12/24*  (2006.01)

(52) U.S. Cl.
CPC .... *H04L 43/0858* (2013.01); *H04L 12/40169* (2013.01); *H04L 43/0805* (2013.01);
(Continued)

(58) Field of Classification Search
CPC ........ H04L 12/40–12/437; H04L 43/08; H04L 43/0805; H04L 43/0811; H04L 43/0817;
(Continued)

(56) References Cited

U.S. PATENT DOCUMENTS 5,390,326 A    2/1995  Shah
6,879,057 B1 *  4/2005  Pinas .................. B60R 16/0238
                                                      307/10.1
(Continued)

FOREIGN PATENT DOCUMENTS

EP          2528228       11/2012
WO          2014009158    1/2014
WO     WO-2014037133 A1 *  3/2014   ......... G01R 31/3627

OTHER PUBLICATIONS

Machine translation of WO2014037133, pp. 1-19 (Year: 2014).*
(Continued)

*Primary Examiner* — Paul H Masur
(74) *Attorney, Agent, or Firm* — Michael Best & Friedrich LLP

(57) ABSTRACT

The invention relates to a method for operating an electric circuit arrangement (1) which has a low-voltage sub-network (2) and a high-voltage sub-network (3). A test signal is transmitted from one of the sub-networks (2, 3) to the other sub-network (3, 2) in order to detect a fault depending on the reception of the signal in the other sub-network (3, 2) and to switch the circuit arrangement (1) to a safe state. A data bus (5), which connects a low-voltage control unit (6) of the low-voltage sub-network (2) to a high-voltage control unit (7) of the high-voltage sub-network (3), is operated with a maximum bus load at least temporarily as a test signal so that data packets are transmitted at fixed time intervals, and a fault is detected depending on a delay of the last received data packet, said delay being detected by the control unit (7, 6) receiving the data packets.

11 Claims, 1 Drawing Sheet

(52) U.S. Cl.
CPC .......... *H04L 43/0811* (2013.01); *H04L 43/50* (2013.01); *H04L 41/0659* (2013.01); *H04L 43/0817* (2013.01); *H04L 2012/40273* (2013.01); *Y04S 40/166* (2013.01); *Y04S 40/168* (2013.01)

(58) Field of Classification Search
CPC . H04L 43/0852; H04L 43/0858; H04L 43/50; H04L 41/0659; Y04S 40/16; Y04S 40/166; Y04S 40/168
See application file for complete search history.

(56) References Cited

U.S. PATENT DOCUMENTS

| | | | | |
|---|---|---|---|---|
| 2003/0137193 A1* | 7/2003 | Belschner | ........... | B60L 11/1881 307/9.1 |
| 2004/0058586 A1* | 3/2004 | Blutbacher | ......... | B60L 11/1881 439/660 |
| 2006/0066109 A1* | 3/2006 | Nasr | ...................... | B60L 11/02 290/40 C |
| 2011/0046844 A1* | 2/2011 | Honner | ................... | H04L 12/12 701/31.4 |
| 2015/0073637 A1* | 3/2015 | Lennevi | ........... | B60W 50/0097 701/22 |
| 2015/0219725 A1* | 8/2015 | Fassnacht | .......... | G01R 31/3627 324/426 |
| 2015/0251559 A1* | 9/2015 | Chauvelier | ......... | B60L 11/1868 307/9.1 |
| 2016/0124028 A1* | 5/2016 | Staudenmaier | ....... | B60L 3/0069 324/713 |
| 2017/0153281 A1* | 6/2017 | Barth | .................... | B60L 3/0046 |

OTHER PUBLICATIONS

International Search Report for Application No. PCT/EP2015/060844 dated Aug. 14, 2015 (English Translation, 2 pages).

* cited by examiner

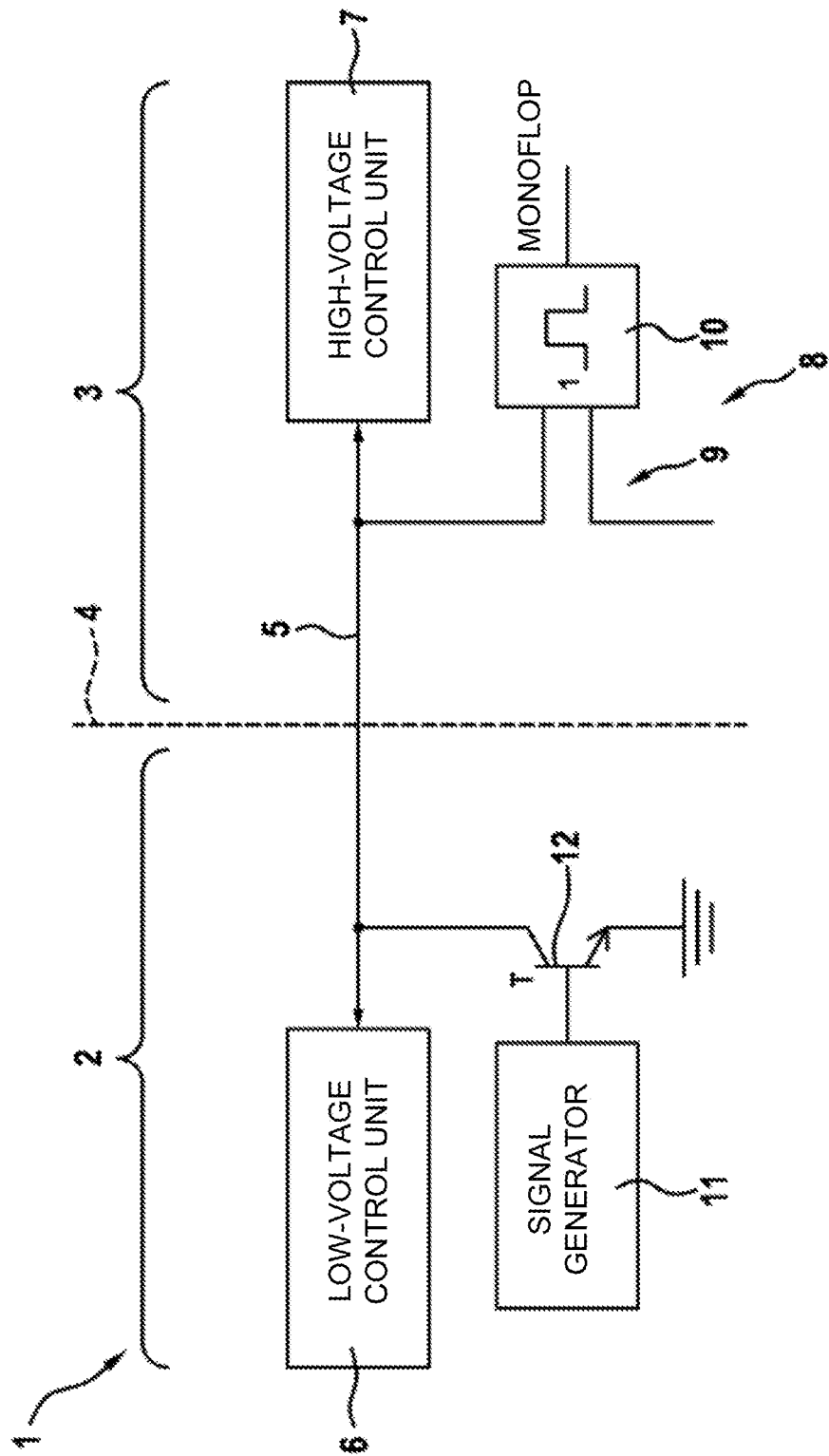

METHOD AND DEVICE FOR OPERATING A CIRCUIT ARRANGEMENT, CIRCUIT ARRANGEMENT

BACKGROUND OF THE INVENTION

The invention relates to a method for operating an electric circuit arrangement which has a low-voltage sub-network and a high-voltage sub-network, which are operatively connected to one another particularly by a coupling device. A test signal is transmitted from one of the sub-networks to the other sub-network in order to detect a fault depending on the reception of the signal in the other sub-network and to switch the circuit arrangement to a safe state.

The invention further relates to a device for operating an electric circuit arrangement which has a low-side voltage sub-network and a high-side voltage sub-network, which are operatively connected to one another particularly by a coupling device. The device comprises a safety device which transmits a test signal from one of the sub-networks to the other sub-network in order to detect a fault depending on the reception of the signal in the other sub-network and to switch the circuit arrangement to a safe state.

The invention further relates to a circuit arrangement comprising a corresponding device.

Methods for operating electric circuit arrangements as well as corresponding circuit arrangements are basically known from the prior art. Such circuit arrangements are particularly used in the so-called hybrid vehicles or respectively vehicles comprising a hybrid drive device. In so doing, a low-voltage sub-network is provided as the on-board electrical system of the vehicle and a high-voltage sub-network as a component of the drive means. Because a significantly higher electrical power is required for the drive than for the on-board electrical system of the vehicle, the two sub-networks have a different voltage level, whereby the one is denoted as the low-voltage sub-network and the other as the high-voltage sub-network. Because the two sub-networks are basically electrically isolated from one another, said sub-networks are generally connected to one another via a coupling device, which overcomes an insulation barrier between said two sub-networks, in order, for example, to supply the low-voltage sub-network with energy from the high-voltage sub-network. In order to reliably detect sources of faults, for example, in order to be able to ensure that the power output stages of the circuit arrangement are switched into a safe state when the driver switches off the drive device, software-independent switch-off paths have to be provided. It is known to date to conduct a signal, which is separate and independent of a low-voltage control unit and a high-voltage control unit, from the low-voltage sub-network to the high-voltage sub-network or respectively from the low-voltage unit to the high-voltage unit. An interruption of the signal at any location on the signal path is then detected as a source of the fault and the circuit arrangement as a whole is transferred into a safe state. Up until now, a separate transmission channel was additionally used to overcome the isolation barrier.

SUMMARY OF THE INVENTION

The method according to the invention has the advantage that a separate transmission channel can be omitted. Instead, a data bus, which generally is already present in any event, is advantageously used between the low-voltage sub-network and the high-voltage sub-network, said data bus usually connecting the low-voltage control unit to the high-voltage control unit. As a result, a double usage of the data bus occurs and the separate transmission channel can be eliminated. According to the invention, this is achieved by the fact that the data bus, which connects the lower-voltage control unit to the high-voltage control unit, is operated with a maximum bus load at least temporarily as a test signal so that data packets are transmitted at fixed time intervals from the one control unit to the other control unit and by the fact that a fault is detected depending on a delay of the last received data packet, said delay being detected by the control unit receiving the data packets. Data packets are thus transmitted as a test signal via the data bus at a fixed time interval, wherein, to this end, the data bus is operated according to the invention with the maximum bus load thereof, whereby data packets are automatically transmitted at fixed time intervals. The maximum time interval between two data packets then depends only on the bus frequency and on the packet length of the respective data packet. On the receiver side, it can then be detected depending on the received data packets and on the time delay to the respectively last detected data packet whether a fault has occurred during the transmission of the data packets and, in particular, whether, for example, more time has elapsed than expected since the last received data packet.

Provision is made according to an advantageous modification to the invention for a fault to be detected if the delay of the last received data packet is greater than the fixed time interval between two consecutive data packets. As a result, a fault can be easily detected in a timely manner and the circuit arrangement can be correspondingly be switched or respectively transferred to a safe state.

Furthermore, provision is preferably made for empty packets to be transmitted in order to set the maximum bus load. If the bus load is not at the maximum thereof due to the normal operation, the maximum bus load is set by adding empty packets, respectively "dummy packets" so that the data packets are transmitted at fixed time intervals. As a result, the detection of the time intervals is simplified on the receiver side. Provision is furthermore preferably made for a monoflop to be used to detect time intervals. The monoflop is particularly designed as a retriggerable monoflop, which is triggered with every rising or with every falling flank on one of the data lines of the data bus. If the hold time of the monoflop is greater than the fixed, respectively constant, time interval between two data packets, a breakdown of the communication on the data bus and thus a fault can be reliably detected or respectively recognized by means of the de-energization of the monoflop.

Provision is furthermore preferably made for no data packet to be transmitted over a predeterminable period of time. The hold time of the monoflop is then preferably matched to the predetermined period of time. The result of this can therefore be that the data bus does not have to be continuously operated with a maximum bus load. The period of time is, however, also thereby increased which is required for detecting a breakdown in communication.

According to an advantageous modification to the invention, provision is made for at least one further method to be carried out for detecting faults in the low-voltage sub-network and/or in the high-voltage sub-network, wherein, upon detecting a fault, the data bus or the data line of the data bus, which data line, is particularly monitored by the monoflop, is connected to ground by means of the further method in order to force an interruption in the packet transmission. Hence, a method for detecting faults running parallel to the method according to the invention can be easily integrated into said method according to the invention. In so doing, provision is particularly made for said further method to draw the correspondingly monitored data line or respectively the data line, via which the data packets are transmitted as previously described, to ground by means of an open collector or respectively an open drain output stage and thus forces a breakdown in communication.

The device according to the invention is characterized in that the safety device has a data bus, which connects a low-voltage control unit of the low-voltage sub-network to a high-voltage control unit of the high-voltage sub-network, and said safety device operates the data bus with a maximum bus load at least temporarily so that the data packets are transmitted at fixed intervals, and a fault is detected depending on a delay of the last received data packet, said delay being detected by the control unit receiving the data packets.

Provision is particularly made for the safety device to have a monoflop in the lower-voltage sub-network or in the high-voltage sub-network which is used to detect the time intervals of the data packets. Further advantages and features result from that which has already been described above.

In a particularly preferred manner, the safety device has at least one signal generating device, which generates the data packets to be detected by the monoflop. The signal generating device is particularly designed independently of a control unit in order to ensure the independent monitoring of the circuit arrangement. The signal generating unit generates the test signal applied to the data bus, as previously described, said test signal being detected by the monoflop for evaluation. Provision is particularly made for the signal generating device to be associated with the low-voltage sub-network and the monoflop with the high-voltage sub-network. A switching element, in particular a semiconductor switching element, for generating the signal can be associated with the signal generating device.

The circuit arrangement according to the invention is characterized by the device according to the invention. The advantages already mentioned above result by means of said inventive device.

BRIEF DESCRIPTION OF THE DRAWINGS

The invention is explained below in detail with the aid of an exemplary embodiment. To this end, the single FIGURE shows a circuit arrangement in a simplified depiction.

DETAILED DESCRIPTION

In a simplified depiction, the single FIGURE shows a circuit arrangement 1 for a motor vehicle comprising a hybrid drive device. The circuit arrangement 1 has a low-voltage sub-network 2 and a high-voltage sub-network 3. The high-voltage sub-network 3 is thereby associated with the drive device and also has, for example, an electric machine, which can be operated to drive the motor vehicle in a motor-driven manner and to generate electrical energy as a generator. The low-voltage network 2 is designed as an on-board electrical system of the motor vehicle and has a reduced electrical voltage output in comparison with the high-voltage sub-network 3. The two sub-networks 2 and 3 are separated from one another by an isolation barrier 4, depicted here by means of a dashed line so that the voltage levels are maintained and so that the high voltage of the high-voltage sub-network 3 cannot lead to damage of components of the low-voltage sub-network 2.

In order to ensure the operation of the circuit arrangement 1, the two sub-networks have to, however, communicate with one another. To this end, a data bus 5 is provided, which connects a low-voltage control unit 6 of the low-voltage sub-network 2 to a high-voltage control unit 7 of the high-voltage sub-network 3. The control units 6, 7 are particularly designed as microcontrollers, which communicate with one another across the isolation barrier by means of the data bus 5.

The circuit arrangement 1 has, furthermore, a device 8 which is designed to monitor the circuit arrangement for a fault and to switch to a safety state if a fault is detected. To this end, the device 8 has a safety device 9, which comprises a monoflop 10 and uses the control units 6, 7 and the data bus 5. In the present example, the safety device 8 carries out the following method:

The data bus 5 is initially operated such that said bus is operated with a maximum bus load; thus enabling data packets from the low-voltage control unit 6 to be transmitted to the high-voltage control unit 7 at fixed time intervals. The monoflop 10 monitors the reception of the data packets on the side of the high-voltage sub-network, said reception then depending only on the bus frequency and the packet length. The monoflop 10 is designed as a retriggerable monoflop, which is triggered by each rising or falling flank on one of the data lines of the data bus 5. If the hold time of the monoflop is greater than the fixed, respectively constant, time interval between two data packets, a breakdown in the communication on the data bus 5 can be detected and thus a fault can be identified by de-energizing the monoflop. In an upwards direction, the hold time of the monoflop is only limited by the period of time, in which communication breakdowns have to be detected.

If the full bandwidth of the data bus 5 is not required, a maximum bus load can nevertheless be achieved by inserting empty packets, respectively "dummy packets", said maximum bus load leading to the fixed time intervals of the data packets to one another. The safety device 8 thus monitors the delay of the of the last detected data packet by means of the monoflop 10. If the detected time delay exceeds the expected fixed time interval, a fault is thus detected.

It is furthermore conceivable not to transmit any data packets for a predeterminable period of time, provided the hold time of the monoflop 10 is matched thereto. As a result, the load of the data bus 5 is reduced; however, the period of time which is required to detect a communication breakdown is also thereby increased. The length of the predeterminable period of time must therefore be decided from application to application.

An additional monitoring circuit on the low-voltage side and/or the high-voltage side, which can likewise adjust a safe state of the circuit arrangement 1, can easily be included in the method described. In so doing, said monitoring circuit, in the case of a fault, draws the monitored data line of the data bus 5 to ground by means of an open collector or open drain output stage and thus force a breakdown in communication, which is correspondingly detected by the monoflop 10.

The signals of the monoflop 10 are, for example, evaluated by the high-voltage control unit 7, which then likewise operates as a component of the safety device 8.

A signal generating device 11 is provided to adjust the data packets independently of the control units 6, 7, said signal generating device 11 switching data packets onto the data bus 5 via a switching element, in particular a semiconductor switching element 12. The data packets are correspondingly received or respectively evaluated by the monoflop 10. The signal generating device 11 and the switching element represent here, in particular, components of the safety device 9.

The invention claimed is:

1. A method for operating an electric circuit arrangement (1) which has a low-voltage sub-network (2) and a high-voltage sub-network (3), wherein a test signal is transmitted from one of the sub-networks (2, 3) to the other sub-network (3, 2) in order to detect a fault depending on the reception of the signal in the other sub-network (3, 2) and to switch the circuit arrangement (1) to a safe state, characterized in that a data bus (5), which connects a low-voltage control unit (6) of the low-voltage sub-network (2) to a high-voltage control unit (7) of the high-voltage sub-network (3), is operated with a maximum bus load at least temporarily as a test signal so that data packets are transmitted at fixed time intervals, and a fault is detected depending on a delay of the last received data packet, said delay being detected by the control unit (7, 6) receiving the data packets.

2. The method according to claim 1, characterized in that a fault is detected if the delay of the last received data packet is greater than the fixed time interval between two consecutive transmitted data packets.

3. The method according to claim 1, characterized in that empty packets are transmitted to adjust the maximum bus load.

4. The method according to claim 1, characterized in that a monoflop (10) is used to detect the time intervals.

5. The method according to claim 1, characterized in that no data packets are transmitted over a predetrminable period of time.

6. The method according to claim 1, characterized in that a further method for detecting faults is carried out in the low-voltage sub-network (2) or the high-voltage sub-network (3), wherein, when detecting a fault by the further method, the data bus (5) is connected to ground in order to force an interruption in the packet transmission.

7. A device (8) for operating an electric circuit arrangement (1), which has a low-voltage sub-network (2) and a high-voltage sub-network (3), said device comprising a safety device (9), which transmits a test signal from one of the sub-networks (2) into the other sub-network (3), in order to detect a fault based on reception of the test signal and to switch the circuit arrangement to a safe state, characterized in that the safety device (9) operates a data bus (5), which connects a low-voltage control unit (6) of the low-voltage sub-network (2) to a high-voltage control unit (7) of the high-voltage sub-network (3), with a maximum bus load at least temporarily as a test signal so that data packets are transmitted at fixed time intervals, and a fault is detected based on a delay of the last received data packet, said delay being detected by the control unit (7, 6) receiving the data packets.

8. The device according to claim 7, characterized in that the safety device (9) includes a monoflop (10).

9. The device according to claim 8, wherein the safety device (9) includes a signal generating device (11).

10. A circuit arrangement comprising a low-voltage sub-network (2) and a high-voltage sub-network (3), characterized by a device according to claim 7.

11. The circuit arrangement according to claim 10, wherein the circuit arrangement is part of a motor vehicle.

\* \* \* \* \*